(12) United States Patent
Liao

(10) Patent No.: US 11,271,799 B2
(45) Date of Patent: Mar. 8, 2022

(54) BLOCKCHAIN CONSENSUS METHOD, NODE, AND SYSTEM BASED ON HONEY BADGER BYZANTINE FAULT TOLERANCE CONSENSUS MECHANISM

(71) Applicant: ALIPAY (HANGZHOU) INFORMATION TECHNOLOGY CO., LTD., Zhejiang (CN)

(72) Inventor: Xiaojun Liao, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/350,031

(22) Filed: Jun. 17, 2021

(65) Prior Publication Data
US 2021/0314216 A1    Oct. 7, 2021

(30) Foreign Application Priority Data

Jul. 3, 2020    (CN) .......................... 202010630013.2

(51) Int. Cl.
| | |
|---|---|
| *H04L 12/24* | (2006.01) |
| *H04L 9/06* | (2006.01) |
| *H04L 41/0659* | (2022.01) |
| *H04L 41/00* | (2022.01) |

(52) U.S. Cl.
CPC ........ *H04L 41/0659* (2013.01); *H04L 9/0643* (2013.01); *H04L 41/30* (2013.01); *H04L 2209/38* (2013.01)

(58) Field of Classification Search
CPC ........ G06F 11/10; G06F 16/214; G06F 16/27; H04L 41/0659; H04L 41/30; H04L 9/0643; H04L 2209/38
See application file for complete search history.

(56) References Cited

U.S. PATENT DOCUMENTS

| | | |
|---|---|---|
| 10,616,324 B1 | 4/2020 | Kaddoura |
| 10,643,288 B2 | 5/2020 | Orsini et al. |
| 10,790,990 B2 | 9/2020 | Zhang |
| (Continued) | | |

FOREIGN PATENT DOCUMENTS

| | | |
|---|---|---|
| CN | 109964242 A | 7/2019 |
| CN | 110022216 A | 7/2019 |
| (Continued) | | |

OTHER PUBLICATIONS

First Search for Chinese Application No. 202010630013.2 dated Aug. 26, 2020.
(Continued)

*Primary Examiner* — Melvin C Marcelo
*Assistant Examiner* — Natali Pascual Peguero

(57) ABSTRACT

A blockchain consensus method includes: performing, by a target consensus node of a blockchain, a current round of consensus, to count consensus votes of N consensus proposals; traversing, by the target consensus node, a first set of consensus proposals, to perform the following steps: migrating consensus proposals that each receive greater than or equal to f+1 and less than 2f+1 identical consensus votes into a second set of consensus proposals; and migrating consensus proposals that each receive less than f+1 identical consensus votes into a third set of consensus proposals as opposition consensus opinions, wherein f is a number of fault tolerant consensus nodes of the blockchain.

20 Claims, 4 Drawing Sheets

(56) References Cited

U.S. PATENT DOCUMENTS

| | | |
|---|---|---|
| 10,812,274 B2 | 10/2020 | Back et al. |
| 10,928,803 B2 | 2/2021 | Biernat et al. |
| 10,938,557 B2 | 3/2021 | Fan et al. |
| 10,949,548 B2 | 3/2021 | Mahatwo et al. |
| 10,984,134 B2 | 4/2021 | Setty et al. |
| 11,018,850 B2 | 5/2021 | Carver et al. |
| 2008/0120240 A1 | 5/2008 | Ginter et al. |
| 2017/0116693 A1 | 4/2017 | Rae et al. |
| 2019/0058581 A1 | 2/2019 | Wood et al. |
| 2019/0251199 A1 | 8/2019 | Klianev |
| 2019/0289068 A1 | 9/2019 | Ma et al. |
| 2019/0340266 A1 | 11/2019 | Vo et al. |
| 2020/0162264 A1 | 5/2020 | Zamani et al. |
| 2020/0252221 A1 | 8/2020 | Zamani et al. |
| 2021/0099283 A1 | 4/2021 | Schvey et al. |

FOREIGN PATENT DOCUMENTS

| | | |
|---|---|---|
| CN | 111342971 A | 6/2020 |
| WO | 2019072296 A2 | 4/2019 |
| WO | 2019072296 A3 | 4/2019 |

OTHER PUBLICATIONS

Extended European Search Report for European Application No. 21 181 539.4 dated Nov. 29, 2021.

Miller et al., "The Honey Badger of BFI Protocols," Nov. 8, 2016.

BLOCKCHAIN CONSENSUS METHOD, NODE, AND SYSTEM BASED ON HONEY BADGER BYZANTINE FAULT TOLERANCE CONSENSUS MECHANISM

CROSS REFERENCE TO RELATED APPLICATIONS

The present application claims priority to Chinese Patent Application No. 202010630013.2, filed with the CNIPA (China National Intellectual Property Administration) of the People's Republic of China on Jul. 3, 2020, the entire contents of which are incorporated herein by reference in the entirety.

TECHNICAL FIELD

This document relates to the field of blockchain technologies, and in particular, to a blockchain consensus method, node, and system based on a Honey Badger Byzantine fault tolerance (BFT) consensus mechanism.

BACKGROUND

Currently, many blockchain systems implement consensus based on a BFT algorithm. As an emerging asynchronous BFT consensus mechanism, Honey Badger BFT has an advantage of being independent of the time condition of a network environment and has an extremely high processing efficiency, and will develop into a mainstream consensus mechanism in the future.

At present, the Honey Badger BFT consensus mechanism reaches consensus by using a binary agreement (BA) protocol. The BA protocol is a random and indeterministic algorithm and includes three stages, in which consensus nodes exchange consensus opinions for the first time, then exchange consensus opinions for the second time, which is conducive to convergence, and finally, make a decision through coin tossing to reach consensus. In the coin tossing stage, if a unified result from one round of coin tossing is not reached, a next round of coin tossing needs to be initiated. Under this background, this application proposes a consensus solution with a higher efficiency for the Honey Badger BFT consensus mechanism.

SUMMARY

An objective of the embodiments of this specification is to provide a blockchain consensus method, node, and system based on a Honey Badger BFT consensus mechanism, which can implement consensus at a higher efficiency based on the Honey Badger BFT consensus mechanism.

In order to achieve the foregoing objective, the embodiments of this specification are implemented in the following manner.

According to a first aspect, a blockchain consensus method based on a Honey Badger BFT consensus mechanism is provided, including: performing, by a target consensus node, a current round of consensus, to count consensus votes of N consensus proposals; traversing, by the target consensus node, a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes, and f is a number of fault tolerant consensus nodes; traversing, by the target consensus node, a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus; merging, by the target consensus node, the second set of consensus proposals into the first set of consensus proposals, and merging the third set of consensus proposals into the fourth set of consensus proposals, to perform a next round of consensus until the first set of consensus proposals stores the N consensus proposals and the N consensus proposals all include greater than or equal to 2f+1 identical consensus votes; and determining, by the target consensus node, a consensus result based on counted consensus votes of the N consensus proposals in the last round of consensus.

According to a second aspect, a consensus node based on a Honey Badger BFT consensus mechanism is provided, including: a consensus vote counting module, configured to perform a current round of consensus, to count consensus votes of N consensus proposals; a first traversing module, configured to traverse a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes, and f is a number of fault tolerant consensus nodes; a second traversing module, configured to traverse a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus; a set update module, configured to merge the second set of consensus proposals into the first set of consensus proposals, and merge the third set of consensus proposals into the fourth set of consensus proposals, to perform a next round of consensus until the first set of consensus proposals stores the N consensus proposals and the N consensus proposals all include greater than or equal to $2f+1$ identical consensus votes; and a consensus result determining module, configured to determine a consensus result based on counted consensus votes of the N consensus proposals in the last round of consensus.

According to a third aspect, a blockchain system based on a Honey Badger BFT consensus mechanism is provided, including a plurality of consensus nodes, and counting, by any target consensus node in the plurality of consensus nodes, consensus votes of N consensus proposals during performing a current round of consensus; traversing, by the target consensus node, a first set of consensus proposals, to perform the following steps: migrating consensus proposals that each include greater than or equal to $f+1$ and less than $2f+1$ identical consensus votes into a second set of consensus proposals; and migrating consensus proposals that do not each include $f+1$ identical consensus opinions into a third set of consensus proposals as opposition consensus opinions, where the first set of consensus proposals is used for storing consensus proposals that each include greater than or equal to $2f+1$ identical consensus votes, and f is a number of fault tolerant consensus nodes; traversing, by the target consensus node, a fourth set of consensus proposals, to perform the following steps: migrating consensus proposals that each include greater than or equal to $2f+1$ identical consensus opinions into the second set of consensus proposals; migrating consensus proposals that each include greater than or equal to $f+1$ and less than $2f+1$ identical consensus opinions and are traceable based on an erasure coding algorithm into the second set of consensus proposals as agreement consensus opinions; migrating consensus proposals that each include greater than or equal to $f+1$ and less than $2f+1$ identical consensus opinions and are untraceable based on the erasure coding algorithm into the third set of consensus proposals as opposition consensus opinions; and migrating consensus proposals that do not each include $f+1$ identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus; merging, by the target consensus node, the second set of consensus proposals into the first set of consensus proposals, and merging the third set of consensus proposals into the fourth set of consensus proposals, to perform a next round of consensus until the first set of consensus proposals stores the N consensus proposals and the N consensus proposals all include greater than or equal to $2f+1$ identical consensus votes; and determining, by the target consensus node, a consensus result based on counted consensus votes of the N consensus proposals in the last round of consensus.

In some embodiments, a blockchain consensus method, comprises: (i) performing, by a target consensus node of a blockchain, a current round of consensus, to count consensus votes of N consensus proposals; (ii) traversing, by the target consensus node, a first set of consensus proposals, to perform the following steps: migrating consensus proposals that each receive greater than or equal to $f+1$ and less than $2f+1$ identical consensus votes into a second set of consensus proposals; and migrating consensus proposals that each receive less than $f+1$ identical consensus votes into a third set of consensus proposals as opposition consensus opinions, wherein f is a number of fault tolerant consensus nodes of the blockchain; (iii) traversing, by the target consensus node, a fourth set of consensus proposals, to perform the following steps: migrating consensus proposals that each receive greater than or equal to $2f+1$ identical consensus votes into the second set of consensus proposals; migrating consensus proposals that each receive greater than or equal to $f+1$ and less than $2f+1$ identical consensus votes and are traceable based on an erasure coding algorithm into the second set of consensus proposals as agreement consensus opinions; migrating consensus proposals that each receive greater than or equal to $f+1$ and less than $2f+1$ identical consensus votes and are untraceable based on the erasure coding algorithm into the third set of consensus proposals as opposition consensus opinions; and migrating consensus proposals that each receive less than $f+1$ identical consensus votes into the third set of consensus proposals as opposition consensus opinions, wherein the fourth set of consensus proposals stores the N consensus proposals in a first round of consensus, and the first set of consensus proposals is an absolute complement of the fourth set of consensus proposals for the N consensus proposals; (iv) merging, by the target consensus node, the second set of consensus proposals into the first set of consensus proposals, and merging the third set of consensus proposals into the fourth set of consensus proposals, to perform a next round of consensus; recursively performing, by the target consensus node, the steps (i)-(iv) until the first set of consensus proposals stores the N consensus proposals and the N consensus proposals each receive greater than or equal to $2f+1$ identical consensus votes; and determining, by the target consensus node, a consensus result based on counted consensus votes of the N consensus proposals in the last round of consensus.

In some embodiments, one or more non-transitory computer-readable storage media storing instructions executable by one or more processors, wherein execution of the instructions causes the one or more processors to perform operations comprising: (i) performing a current round of consensus, to count consensus votes of N consensus proposals; (ii) traversing a first set of consensus proposals, to perform the following steps: migrating consensus proposals that each receive greater than or equal to $f+1$ and less than $2f+1$ identical consensus votes into a second set of consensus proposals; and migrating consensus proposals that each receive less than $f+1$ identical consensus votes into a third set of consensus proposals as opposition consensus opinions, wherein f is a number of fault tolerant consensus nodes of a blockchain; (iii) traversing a fourth set of consensus proposals, to perform the following steps: migrating consensus proposals that each receive greater than or equal to $2f+1$ identical consensus votes into the second set of consensus proposals; migrating consensus proposals that each receive greater than or equal to $f+1$ and less than $2f+1$ identical consensus votes and are traceable based on an erasure coding algorithm into the second set of consensus proposals as agreement consensus opinions; migrating consensus proposals that each receive greater than or equal to $f+1$ and less than $2f+1$ identical consensus votes and are untraceable based on the erasure coding algorithm into the third set of consensus proposals as opposition consensus opinions; and migrating consensus proposals that each receive less than $f+1$ identical consensus votes into the third set of consensus proposals as opposition consensus opinions, wherein the fourth set of consensus proposals stores the N consensus proposals in a first round of consensus, and the first set of consensus proposals is an absolute complement of the fourth set of consensus proposals for the N consensus proposals; (iv) merging the second set of consensus proposals into the first set of consensus proposals, and merging the third set of consensus proposals into the fourth set of consensus proposals, to perform a next round of consensus; recursively performing the steps (i)-(iv) until the first set of consensus proposals stores the N consensus proposals and the N consensus proposals each receive greater than or equal to 2f+1 identical consensus votes; and determining a consensus result based on counted consensus votes of the N consensus proposals in the last round of consensus.

In some embodiments, a system comprising one or more processors and one or more non-transitory computer-readable memories coupled to the one or more processors and configured with instructions executable by the one or more processors to cause the system to perform operations comprising: (i) performing a current round of consensus, to count consensus votes of N consensus proposals; (ii) traversing a first set of consensus proposals, to perform the following steps: migrating consensus proposals that each receive greater than or equal to f+1 and less than 2f+1 identical consensus votes into a second set of consensus proposals; and migrating consensus proposals that each receive less than f+1 identical consensus votes into a third set of consensus proposals as opposition consensus opinions, wherein f is a number of fault tolerant consensus nodes of a blockchain; (iii) traversing a fourth set of consensus proposals, to perform the following steps: migrating consensus proposals that each receive greater than or equal to 2f+1 identical consensus votes into the second set of consensus proposals; migrating consensus proposals that each receive greater than or equal to f+1 and less than 2f+1 identical consensus votes and are traceable based on an erasure coding algorithm into the second set of consensus proposals as agreement consensus opinions; migrating consensus proposals that each receive greater than or equal to f+1 and less than 2f+1 identical consensus votes and are untraceable based on the erasure coding algorithm into the third set of consensus proposals as opposition consensus opinions; and migrating consensus proposals that each receive less than f+1 identical consensus votes into the third set of consensus proposals as opposition consensus opinions, wherein the fourth set of consensus proposals stores the N consensus proposals in a first round of consensus, and the first set of consensus proposals is an absolute complement of the fourth set of consensus proposals for the N consensus proposals; (iv) merging the second set of consensus proposals into the first set of consensus proposals, and merging the third set of consensus proposals into the fourth set of consensus proposals, to perform a next round of consensus; recursively performing the steps (i)-(iv) until the first set of consensus proposals stores the N consensus proposals and the N consensus proposals each receive greater than or equal to 2f+1 identical consensus votes; and determining a consensus result based on counted consensus votes of the N consensus proposals in the last round of consensus.

Based on the solutions of the embodiments of this specification, a consensus node of a blockchain initiates a plurality of rounds of iterative consensus votes on consensus proposals in a consensus stage, updates local consensus opinions according to a consensus vote result of the consensus proposals in each round of consensus, and initiates a consensus vote for the latest local consensus opinions on consensus proposals for which consensus has not been reached, so that consensus nodes in the blockchain converge in one direction for the consensus opinions of the consensus proposals, to achieve consensus faster, thereby greatly reducing rounds required for message exchange and effectively improving a consensus efficiency.

BRIEF DESCRIPTION OF THE DRAWINGS

To describe the technical solutions in the embodiments of this specification or in the prior art more clearly, the accompanying drawings required for describing the embodiments or the prior art are briefly introduced below. Apparently, the accompanying drawings in the following description show merely some embodiments of this specification, and a person of ordinary skill in the art may still derive other accompanying drawings from these accompanying drawings without creative efforts.

DETAILED DESCRIPTION

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

As described above, at present, a Honey Badger BFT consensus mechanism reaches consensus by using a binary agreement (BA) protocol. The BA protocol is a random and indeterministic algorithm and includes three stages of exchanging consensus opinions between consensus nodes the first time, exchanging consensus opinions the second time for convergence, and making a decision finally through coin tossing to implement consensus. In the coin tossing stage, if a unified result from one round of coin tossing is not reached, a next round of coin tossing needs to be initiated. For a blockchain system, due to the uncertainty of the BA protocol, initiating a plurality of rounds of message exchange in a case of an uncontrollable network may lead to a decrease in a consensus efficiency. In view of this, this application proposes a consensus solution with a higher efficiency for the Honey Badger BFT consensus mechanism.

Figure 1:
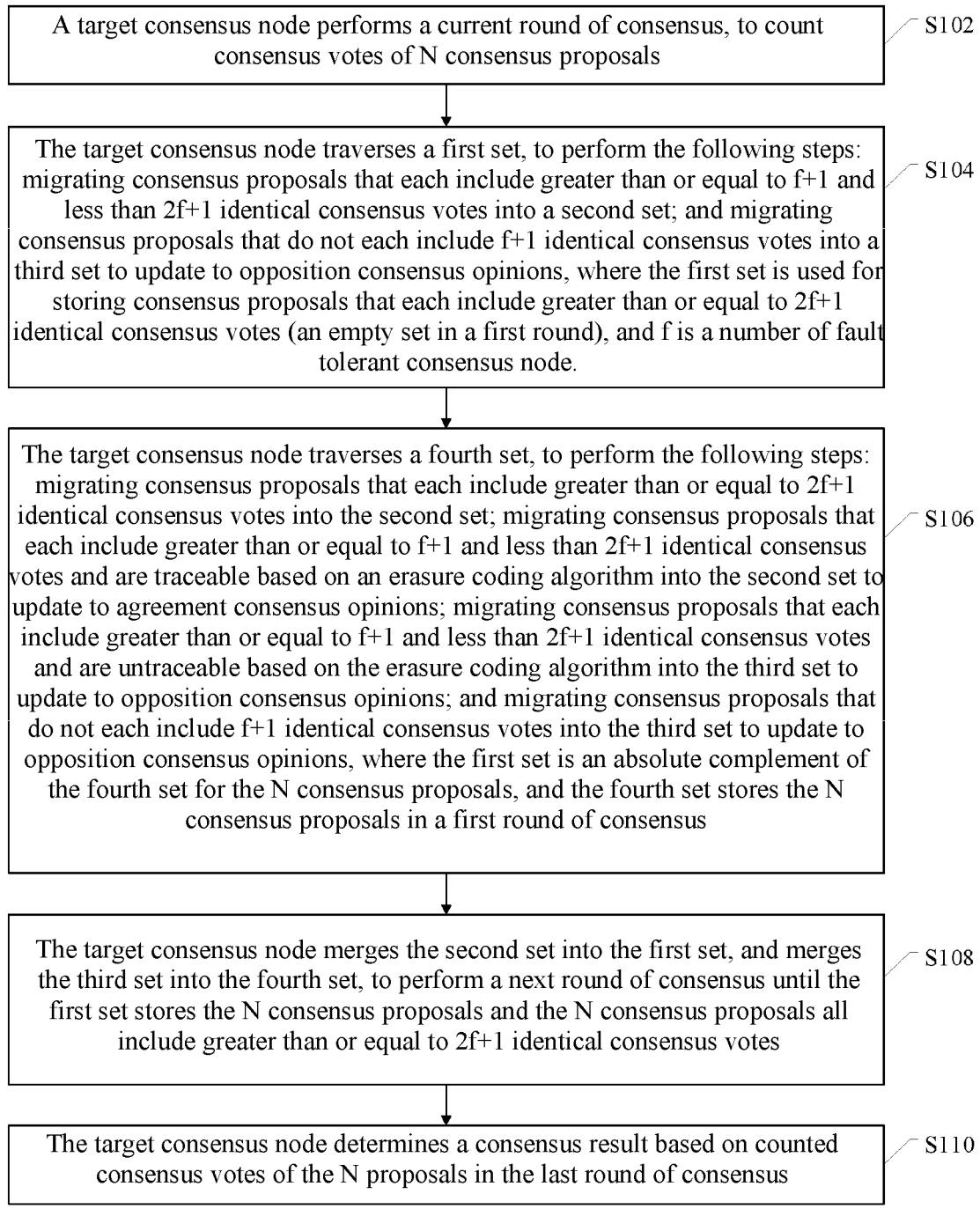
FIG. 1 is a first schematic flowchart of a blockchain consensus method, according to some embodiments of this specification.

FIG. 1 is a flowchart of a blockchain consensus method based on a Honey Badger BFT consensus mechanism, according to some embodiments of this specification. The method shown in FIG. 1 may be performed by a corresponding apparatus below with respect to FIG. 3 to FIG. 5 and includes the following steps.

S102: A target consensus node performs a current round of consensus, to count consensus votes of N consensus proposals.

In the Honey Badger BFT consensus mechanism, consensus nodes in a blockchain initiate respective consensus proposals, that is, a total number of the consensus nodes in the blockchain is also N.

In each round of consensus, the consensus nodes all need to broadcast respective consensus votes on N consensus proposals to other consensus nodes through Consensus Messages. In some embodiments, a consensus vote of a target consensus node for a target consensus proposal represents a consensus opinion of the target consensus node for the target consensus proposal, if the target consensus node opposes (disapproves) the target consensus proposal, an opposition consensus vote is cast; otherwise, if the target consensus node agrees with the target consensus proposal, an agreement consensus vote is cast.

S104: The target consensus node traverses a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes (an empty set in a first round), and f is a number of fault tolerant consensus nodes. In this specification, consensus votes "included" in a given consensus proposal may refer to consensus votes received for the given consensus proposal.

In this step, after the Consensus Messages transmitted by 2f other consensus nodes are counted (that is, 2f+1 consensus votes in total including a consensus vote by the target consensus node), the target consensus node starts to traverse the first set of consensus proposals.

In the Honey Badger BFT consensus mechanism, one consensus proposal has one and only one type of consensus votes (opposition consensus votes or agreement consensus votes) reaching a number greater than or equal to 2f+1, and a corresponding consensus result is a result indicated by the consensus votes of the number greater than or equal to 2f+1. That is, a consensus proposal that includes greater than or equal to 2f+1 identical consensus votes is a consensus proposal on which consensus has been reached already, a consensus proposal that includes greater than or equal to f+1 and less than 2f+1 identical consensus votes is a consensus proposal on which consensus is about to be reached, and a consensus proposal that does not include f+1 identical consensus opinions is a consensus proposal on which consensus is far from being reached. Identical consensus votes refer to opposition or agreement consensus votes. That is, the identical consensus votes are uniform as regard to opposition or agreement. Each of the identical consensus votes for a given consensus proposal may have been received from a unique consensus node.

S106: The target consensus node traverses a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus.

In this step, to expedite reaching consensus on a consensus proposal that includes greater than or equal to f+1 and less than 2f+1 identical consensus opinions, the target consensus node may trace consensus opinions based on the erasure coding algorithm, and if the consensus opinions can be traced, the consensus opinions are migrated into the second set of consensus proposals and are updated to agreement consensus opinions, to cast agreement consensus votes in a next round of consensus; and if the consensus opinions cannot be traced, the consensus opinions are migrated into the third set of consensus proposals and are updated to opposition consensus opinions, to cast opposition consensus votes in a next round of consensus.

In addition, for a consensus proposal that does not include f+1 identical consensus opinions in the fourth set of consensus proposals, it indicates that the consensus nodes in the blockchain cannot reach an agreement. Therefore, in order to expedite consensus, the target consensus node may directly migrate the consensus proposal to the third set of consensus proposals and update consensus opinions in the third set of consensus proposals to opposition consensus opinions.

In addition, if the fourth set of consensus proposals includes only consensus opinions that include opposition consensus votes, even when a number of votes does not reach f+1, the consensus opinions are directly migrated into the second set of consensus proposals and updated to opposition consensus opinions. In general, if a consensus vote is opposed by more than one consensus node, the consensus vote is most likely opposed by other consensus nodes. Therefore, this type of consensus proposals may be considered as consensus nodes on which opposition opinions are about to be reached and are stored in the second set of consensus proposals.

In addition, Consensus Messages may be configured for the first set of consensus proposals and the fourth set of consensus proposals. For example, a Consensus Message transmitted by the target consensus node includes: a field value of consensus votes of consensus proposals in the fourth set of consensus proposals and a field value of consensus votes of consensus proposals in the first set of consensus proposals that are locally recorded by the target consensus node.

S108: The target consensus node merges the second set of consensus proposals into the first set of consensus proposals, and merges the third set of consensus proposals into the fourth set of consensus proposals, to perform a next round of consensus until the first set of consensus proposals stores the N consensus proposals and the N consensus proposals all include greater than or equal to 2f+1 identical consensus votes.

In some embodiments, a consensus process is performed for a plurality of rounds of iterations. In S104 and S106, the target consensus node may update consensus opinions of some consensus proposals, to cast consensus votes different from those of the previous round of consensus in the next round of consensus, thereby affecting a consensus result. When the first set of consensus proposals stores the N consensus proposals and the N consensus proposals all include greater than or equal to 2f+1 identical consensus votes, it indicates that the N consensus proposals all have a condition of reaching consensus, and the target consensus node exits the plurality of rounds of iterations in this case.

S110. The target consensus node determines a consensus result based on counted consensus votes of the N consensus proposals in the last round of consensus.

As described above, when a number of one type of consensus votes of one consensus proposal reaches 2f+1, it indicates that the consensus result of the consensus proposal is a result represented by the consensus votes. For example, when one consensus proposal includes greater than or equal to 2f+1 opposition consensus votes, the consensus result of the consensus proposal fails and the proposal data thereof is not added to the blockchain.

Based on the blockchain consensus method shown in FIG. 1 of this embodiment, a consensus node of a blockchain initiates a plurality of rounds of iterative consensus votes on consensus proposals in a consensus stage, updates local consensus opinions according to a consensus vote result of the consensus proposals in each round of consensus, and initiates a consensus vote for the latest local consensus opinions on consensus proposals for which consensus has not been reached, so that consensus nodes in the blockchain converge in one direction for the consensus opinions of the consensus proposals, to achieve consensus faster, thereby greatly reducing rounds required for message exchange and effectively improving a consensus efficiency.

The following describes the blockchain consensus method of the embodiments of this specification in detail.

The blockchain consensus method of the embodiments of this specification is mainly divided into two stages:

Stage 1: A consensus node transmits, based on a reliable broadcast (RBC) protocol, a consensus proposal initiated by the consensus node.

In this stage, a consensus proposal is transmitted by using an RBC protocol, an erasure coding technology used in this protocol can effectively reduce network bandwidth of an initiator.

Stage 2: Collect an RBC result of the consensus proposal and perform certainty consensus. A related data structure is defined as follows:

1) View: a batch number of a consensus view, that is, a serial number of a newly generated block after the consensus is completed.

2) Round: a number of rounds performed in View consensus. A default value is 0 and is automatically increased by 1 every time a new round of consensus vote is initiated.

3) Unconfirmed_Proposals (that is, the foregoing fourth set of consensus proposals, and hereinafter referred to as the a set U for short): storing consensus proposals that have completed the RBC protocol and related information (for example, root hash) in a first round of consensus, and storing consensus proposals that cannot be confirmed and related information in subsequent rounds of consensus.

4) Confirmed_Proposals (that is, the foregoing first set of consensus proposals, and hereinafter referred to as a set C for short): an empty set in the first round of consensus, and used for reserving consensus proposals that include greater than or equal to 2f+1 identical consensus votes in the subsequent rounds of consensus. When the set C stores N consensus proposals and each consensus proposal includes 2f+1 identical consensus votes, this batch of iteration is ended.

5) Consensus Message: used for exchanging consensus votes among consensus nodes. A structure of the Consensus Message is as follows:

```
struct ConsensusMessage {
    NodeId sender;
    Seq seq;
    Round round;
    vector[proposal hash] Unconfirmed_Proposals;
    vector[proposal hash] Confirmed_Proposals;
}
```

Note: In the two arrays Unconfirmed_Proposals and Confirmed_Proposals, a sequence of a consensus node may be represented by using a subscript value. In an Unconfirmed_Proposals field, consensus votes of consensus proposals of the Unconfirmed_Proposals set are recorded. Herein, a root hash of a consensus proposal may be used to represent an agreement consensus vote, and Ø is used to represent an opposition consensus vote. In a Confirmed_Proposals field, consensus votes of consensus proposals of the Confirmed_Proposals set are recorded. Similarly, a root hash of a consensus proposal may be used to represent an agreement consensus vote, and Ø is used to represent an opposition consensus vote.

For example, it is assumed that there are four consensus nodes A, B, C, and D, a root hash of a consensus proposal initiated by the consensus node A is a1, a root hash of a consensus proposal initiated by a consensus node B is b1, a root hash of a consensus proposal initiated by the consensus node C is c1, a root hash of a consensus proposal initiated by the consensus node D is d1, and the consensus node D receives 2f+1 Consensus Messages in a first round of consensus:

{sender:A,Seq:100,round:0,Unconfirmed_Proposals {a1, null,c1,d1},Confirmed_Proposal s{ }};

{sender:C,Seq:100,round:0,Unconfirmed_Proposals {a1, null,c1,d1},Confirmed_Proposal s{ }};

{sender:D,Seq:100,round:O,Unconfirmed_Proposals {a1, b1,c1,d1},Confirmed_Proposals { }};

where sender records an identifier of a consensus node, and Seq records a serial number of a consensus view. Information recorded in the Unconfirmed_Proposals is as follows:

a proposal of the consensus node A: {a1:3}, which represents 3 agreement consensus votes;

a proposal of the consensus node B: {null:3}, which represents 3 opposition consensus votes;

a proposal of the consensus node C: {c1:3}, which represents 3 agreement consensus votes; and a proposal of the consensus node D: {d1:2, d2:1}, which represents 2 agreement consensus votes and 1 opposition consensus vote.

In addition, the Confirmed_Proposals may also record a result whether consensus is reached, which is represented by using 0 or 1, and if consensus may be reached on a consensus vote of one consensus proposal, the value of the result is 1, otherwise, the value of the result is 0.

Figure 2:
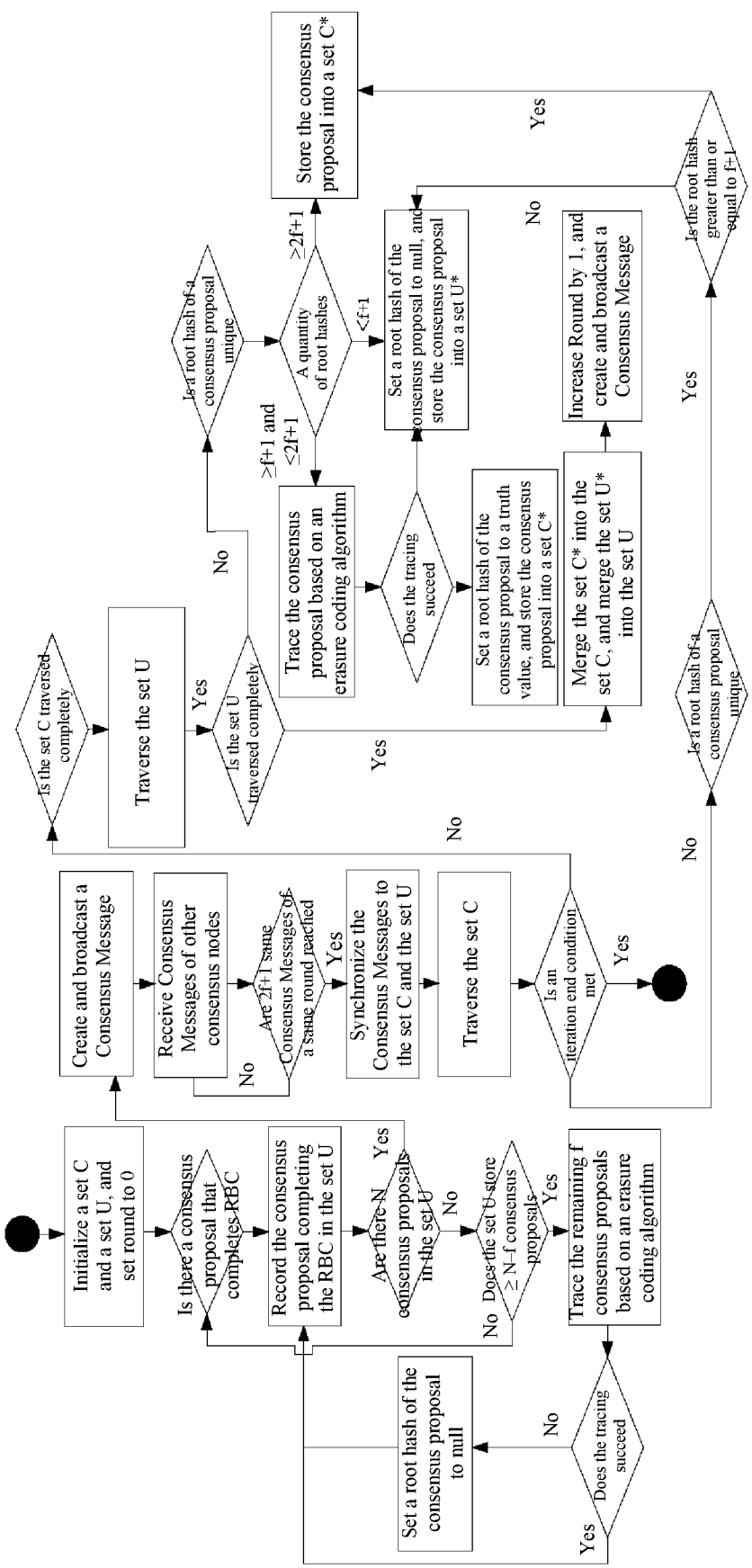
FIG. 2 is a second schematic flowchart of a blockchain consensus method, according to some embodiments of this specification.

A main procedure of the consensus method of the embodiments of this specification is shown in FIG. 2 and includes the following steps:

Step 1: A target consensus node resets two local sets Unconfirmed_Proposals and Confirmed_Proposals to empty sets, and reset a local variable round to 0.

Step 2: The target consensus node performs an RBC protocol, updates a consensus proposal that completes the RBC protocol into the set U, and adds a root hash of the consensus proposal as a truth value to represent an agreement consensus opinion.

Step 3: The target consensus node checks a number of consensus proposals in the set U, it is assumed that the number of proposals is x, if x<2f+1, the target consensus node continues to perform step 2; if x≥2f+1, the target consensus node traces the remaining f consensus proposals based on an erasure coding algorithm (in general, a number of consensus nodes of a blockchain needs to meet a relationship of N=3f+1), updates the consensus proposals into the set U if the consensus proposals are successfully traced, and sets root hashes of the consensus proposals to truth values; otherwise, updates the consensus proposals into the set U, and sets root hashes to null, to represent an opposition consensus opinion.

After that, a local Consensus Message is generated, a ConsensMessage.Unconfirmed_Proposals field of the Consensus Message is filled by using information recorded in the Unconfirmed_Proposals, a ConsensMessage.Confirmed_Proposals field is set to null, Round is set to 0, and the Consensus Message is broadcast to other consensus nodes.

Step 4: The target consensus node performs step 5 after receiving the Consensus Messages transmitted by the other consensus nodes in the same manner and obtaining 2f+1 Consensus Messages of the same round including the Consensus Message of the target consensus node.

Step 5: The target consensus node traverses consensus proposals of the set C.

The target consensus node first determines whether the set C stores N consensus proposals and whether each consensus proposal includes 2f+1 same root hashes. If yes, this batch of iteration is ended, and the set C is used as a consensus result set of the N consensus proposals; otherwise, the following steps are performed: migrating consensus proposals that each include greater than or equal to f+1 and less than 2f+1 same root hashes into a temporary Confirmed_Proposals set (that is, the foregoing second set of consensus proposals, and hereinafter referred to as a set C* for short); migrating consensus proposals that do not each include f+1 identical consensus opinions into a temporary Unconfirmed_Proposals set (that is, the foregoing third set of consensus proposals, and hereinafter referred to as a set U* for short), and updating root hashes to null to represent opposition consensus opinions. If all the consensus proposals are traversed completely, step 6 is performed sequentially.

Step 6: Traverse consensus proposals of the set U: directly placing consensus proposals with root hashes being null into the set C*, and if a local root hash is a truth value, changing the local root hash to null; migrating consensus proposals that each include greater than or equal to 2f+1 same root hashes into the set C*; tracing consensus proposals that include greater than or equal to f+1 and less than 2f+1 same root hashes based on an erasure coding algorithm, migrating the consensus proposals into the set C* if the tracing succeeds, and if a local root hash is null, changing the local root hash to a truth value; if the tracing fails, migrating the consensus proposals into the set U*, and if a local root hash is a truth value, changing the local root hash to null; and migrating consensus proposals that do not each include f+1 same root hashes into the set U*, and if a local root hash is a truth value, changing the local root hash to null.

Step 7: Merge the set C* back into the set C to generate a new set C, merge the set U* back into the set U to generate a new set U, increase Round by 1, fill an Unconfirmed_Proposals field and a Confirmed_Proposal field in the Consensus Message by using the new set C and the new set U, and broadcast the Consensus Message. Subsequently, go back to step 4.

The method according to the embodiments of this specification is introduced as above. Appropriate changes may be further made without departing from the foregoing principles herein, and these changes should also be regarded as the protection scope of the embodiments of this specification.

Figure 3:
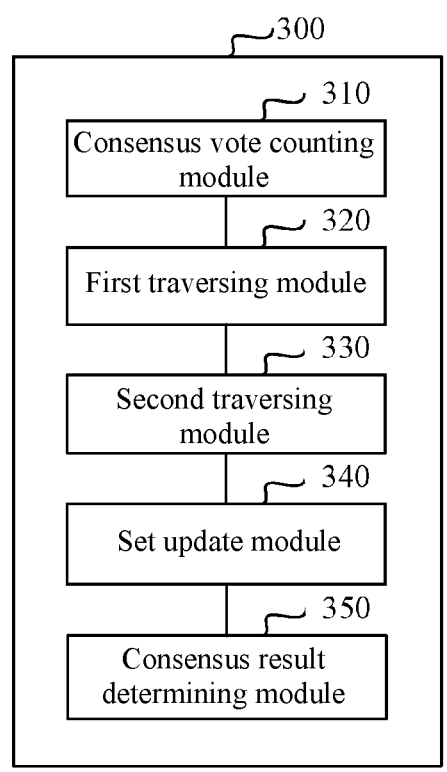
FIG. 3 is a schematic structural diagram of a consensus node, according to some embodiments of this specification.

Corresponding to the consensus method, some embodiments of this specification further provide a consensus node based on a Honey Badger BFT consensus mechanism. FIG. 3 is a schematic structural diagram of the consensus node 300, and the consensus node includes: a consensus vote counting module 310, configured to perform a current round of consensus, to count consensus votes of N consensus proposals; a first set of consensus proposals traversing module 320, configured to traverse a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes, and f is a number of fault tolerant consensus nodes; a second set of consensus proposals traversing module 330, configured to traverse a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus; a set update module 340, configured to merge the second set of consensus proposals into the first set of consensus proposals, and merge the third set of consensus proposals into the fourth set of consensus proposals, to perform a next round of consensus until the first set of consensus proposals stores the N consensus proposals and the N consensus proposals all include greater than or equal to 2f+1 identical consensus votes; and a consensus result determining module 350, configured to determine a consensus result based on counted consensus votes of the N consensus proposals in the last round of consensus.

Based on the embodiments of this specification, a consensus node initiates a plurality of rounds of iterative consensus votes on consensus proposals in a consensus stage, updates local consensus opinions according to a consensus vote result of the consensus proposals in each round of consensus, and initiates a consensus vote for the latest local consensus opinions on consensus proposals for which consensus has not been reached, so that consensus nodes in the blockchain converge in one direction for the consensus opinions of the consensus proposals, to achieve consensus faster, thereby greatly reducing rounds required for message exchange and effectively improving a consensus efficiency.

Optionally, the consensus node further includes: an RBC protocol module, configured to transmit, based on an epoch message in an RBC protocol, consensus proposals initiated by the target consensus node to other consensus nodes, and after consensus proposals transmitted by 2f other consensus nodes through the epoch message are received, trace, based on the erasure coding algorithm, remaining consensus proposals not received, where in the first round of consensus, the target consensus node casts opposition consensus votes for consensus proposals that are untraceable based on the erasure coding algorithm in an RBC protocol stage and casts agreement consensus votes for remaining consensus proposals.

Optionally, the second set of consensus proposals traversing module 330, when performed, is further configured to migrate consensus proposals that each receive only opposition consensus votes into the second set of consensus proposals.

Optionally, the consensus node further includes: a consensus synchronization module, configured to exchange a Consensus Message respectively with other consensus nodes to count the consensus votes of the N consensus proposals, where the Consensus Message transmitted by the target consensus node includes: a field value of consensus votes of consensus proposals in the fourth set of consensus proposals and a field value of consensus votes of consensus proposals in the first set of consensus proposals that are locally recorded by the target consensus node.

Optionally, a field value of consensus votes of a consensus proposal agreed by the target consensus node in the Consensus Message is a root hash corresponding to the consensus proposal, and a field value of consensus votes of a consensus proposal opposed by the target consensus node in the Consensus Message is 0.

Optionally, the Consensus Message further includes: a field value used for indicating a serial number of a consensus view and/or a field value used for indicating a consensus round.

Optionally, after the consensus vote counting module 310 counts Consensus Messages transmitted by 2f other consensus nodes, the first set of consensus proposals traversing module 320 starts to traverse the first set of consensus proposals.

Optionally, the consensus node further includes: a control module, configured to: after the first set of consensus proposals traversing module 320 traverses the first set of consensus proposals, determine whether the first set of consensus proposals stores the N consensus proposals and whether the N consensus proposals each receive greater than or equal to 2f+1 identical consensus votes, and if yes, end the consensus; otherwise, control the second set of consensus proposals traversing module 330 to start to traverse the fourth set of consensus proposals.

The N consensus proposals are initiated by different consensus nodes, any consensus proposal has one and only one type of consensus votes of a number greater than or equal to 2f+1, and a corresponding consensus result is a result indicated by the consensus votes of the number greater than or equal to 2f+1.

Apparently, the consensus node of this embodiment of this specification may be used as an entity for performing the blockchain consensus method shown in FIG. 1. Therefore, the consensus node can implement functions achieved in the blockchain consensus method in FIG. 1 and FIG. 2.

Figure 4:
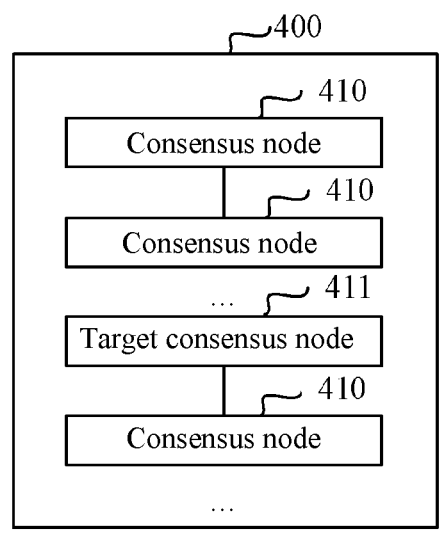
FIG. 4 is a schematic structural diagram of a blockchain system, according to some embodiments of this specification.

Corresponding to the consensus method, some embodiments of this specification further provide a blockchain system based on a Honey Badger BFT consensus mechanism. FIG. 4 is a schematic structural diagram of a blockchain system 400. The blockchain system includes a plurality of consensus nodes 410.

Any target consensus node 411 in the plurality of consensus nodes 410 counts consensus votes of N consensus proposals during performing a current round of consensus.

The target consensus node 411 traverses a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes, and f is a number of fault tolerant consensus nodes.

The target consensus node 411 traverses a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus.

The target consensus node 411 merges the second set of consensus proposals into the first set of consensus proposals, and merging the third set of consensus proposals into the fourth set of consensus proposals, to perform a next round of consensus until the first set of consensus proposals stores the N consensus proposals and the N consensus proposals all include greater than or equal to 2f+1 identical consensus votes.

The target consensus node 411 determines a consensus result based on counted consensus votes of the N consensus proposals in the last round of consensus.

In a blockchain system of some embodiments of this specification, a consensus node initiates a plurality of rounds of iterative consensus votes on consensus proposals in a consensus stage, updates local consensus opinions according to a consensus vote result of the consensus proposals in each round of consensus, and initiates a consensus vote for the latest local consensus opinions on consensus proposals for which consensus has not been reached, so that consensus nodes in the blockchain converge in one direction for the consensus opinions of the consensus proposals, to achieve consensus faster, thereby greatly reducing rounds required for message exchange and effectively improving a consensus efficiency.

Apparently, the blockchain system of this embodiment of this specification may be used as an entity for performing the blockchain consensus method shown in FIG. 1. Therefore, the blockchain system can implement functions achieved in the blockchain consensus method in FIG. 1 and FIG. 2. Due to the same principle, the functions are not repeated herein again.

Figure 5:
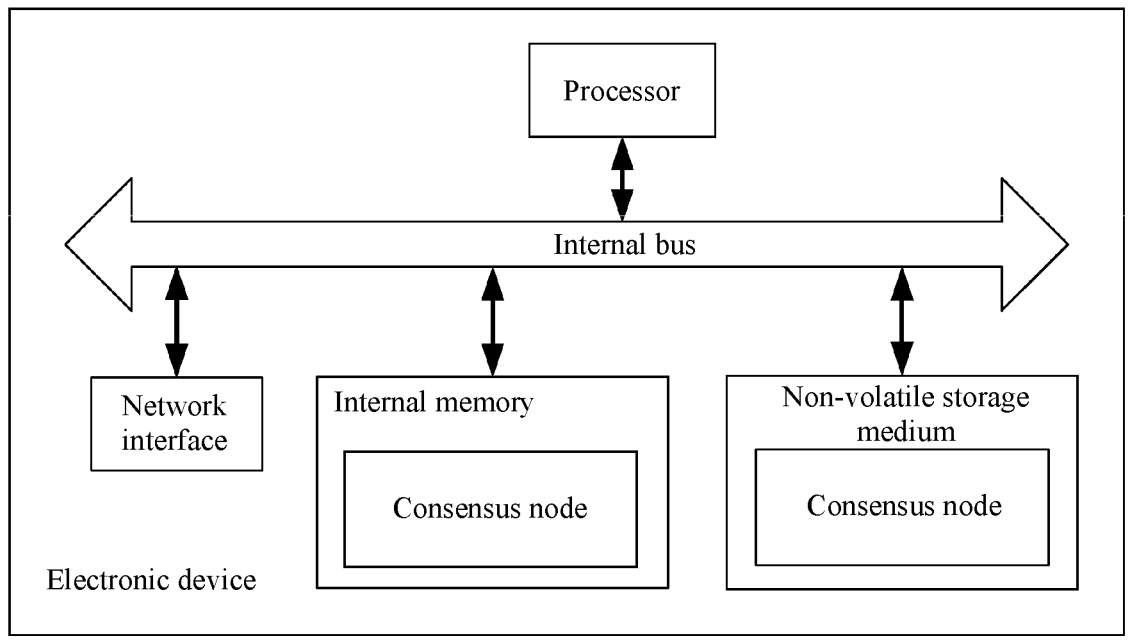
FIG. 5 is a schematic structural diagram of an electronic device, according to some embodiments of this specification.

FIG. 5 is a schematic structural diagram of an electronic device, according to some embodiments of this specification. Referring to FIG. 5, in terms of the hardware, the electronic device includes a processor, and optionally includes an internal bus, a network interface, and a memory. The memory may include an internal memory, such as a high-speed random access memory (RAM), and may further include a non-volatile memory, such as at least one disk storage. Definitely, the electronic device may further include hardware required for other services.

The processor, the network interface, and the memory may be connected to each other through an internal bus. The internal bus may be an industry standard architecture (ISA) bus, a peripheral component interconnect (PCI) bus, an extended industry standard architecture (EISA) bus, or the like. The bus may be classified as an address bus, a data bus, a control bus, or the like. For ease of indication, only one bidirectional arrow is used for indication in FIG. 5, but it does not mean that there is only one bus or one type of bus.

The memory is configured to store a program. For example, the program may include program code, and the program code includes computer operation instructions. The memory may include an internal memory and a non-volatile memory, and provide an instruction and data to the processor.

The processor reads a corresponding computer program from the non-volatile memory to the internal memory and then runs the corresponding computer program, and forms the consensus node shown in FIG. 3 on a logical level. The processor executes the program stored in the memory and is configured to perform the following operations: performing a current round of consensus, to count consensus votes of N consensus proposals; traversing a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes, and f is a number of fault tolerant consensus nodes; traversing a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus; merging the second set of consensus proposals into the first set of consensus proposals, and merging the third set of consensus proposals into the fourth set of consensus proposals, to perform a next round of consensus until the first set of consensus proposals stores the N consensus proposals and the N consensus proposals all include greater than or equal to 2f+1 identical consensus votes; and determining a consensus result based on counted consensus votes of the N consensus proposals in the last round of consensus.

The foregoing blockchain consensus method disclosed in the embodiment shown in FIG. 1 of this specification may be applicable to the processor or implemented by the processor. The processor may be an integrated circuit chip, and has a signal processing capability. During implementation, the steps of the foregoing method may be completed through an integrated logic circuit of hardware or an instruction in the form of software in the processor. The foregoing processor may be a general-purpose processor, including a central processing unit (CPU), a network processor (NP), and the like; or may be a digital signal processor (DSP), an application specific integrated circuit (ASIC), a field-programmable gate array (FPGA), or other programmable logic devices, a discrete gate or a transistor logic device, or a discrete hardware component. The methods, steps, and logical block diagrams disclosed in the embodiments of this specification may be implemented or performed. The general-purpose processor may be a microprocessor, or the processor may be any conventional processor or the like. The steps of the method disclosed in combination with the embodiments of this specification may be directly embodied as being performed by a hardware decoding processor, or performed by a combination of hardware and software modules in the decoding processor. The software module may be stored in a storage medium that is mature in the art, such as a random access memory (RAM), a flash memory, a read-only memory (ROM), a programmable ROM, an electrically erasable programmable memory, or a register. The storage medium is located in the memory. The processor reads information in the memory and completes the steps of the methods in combination with hardware thereof.

The electronic device according to the embodiment of this specification can implement the functions of the consensus node shown in FIG. 3 achieved in the embodiments of FIG. 1 and FIG. 2, which is not described herein again.

Definitely, in addition to the software implementation, the electronic device of this specification does not exclude other implementations, such as a logic device or a combination of software and hardware. In other words, an entity for performing the following processing flow is not limited to each logic unit, and may alternatively be the hardware or logic device.

In addition, some embodiments of this specification further provide a computer-readable storage medium storing one or more programs. The one or more programs include instructions. The instructions, when executed by a portable electronic device including a plurality of application programs, can cause the portable electronic device to perform the method of the embodiment shown in FIG. 1 and can be configured to perform the following method: performing a current round of consensus, to count consensus votes of N consensus proposals; traversing a first set of consensus proposals, to perform the following steps: migrating consensus proposals that each include greater than or equal to f+1 and less than 2f+1 identical consensus votes into a second set of consensus proposals; and migrating consensus proposals that do not each include f+1 identical consensus opinions into a third set of consensus proposals as opposition consensus opinions, where the first set of consensus proposals is used for storing consensus proposals that each include greater than or equal to 2f+1 identical consensus votes, and f is a number of fault tolerant consensus nodes; traversing a fourth set of consensus proposals, to perform the following steps: migrating consensus proposals that each include greater than or equal to 2f+1 identical consensus opinions into the second set of consensus proposals; migrating consensus proposals that each include greater than or equal to f+1 and less than 2f+1 identical consensus opinions and are traceable based on an erasure coding algorithm into the second set of consensus proposals as agreement consensus opinions; migrating consensus proposals that each include greater than or equal to f+1 and less than 2f+1 identical consensus opinions and are untraceable based on the erasure coding algorithm into the third set of consensus proposals as opposition consensus opinions; and migrating consensus proposals that do not each include f+1 identical consensus opinions into the third set of consensus proposals as opposition consensus opinions, where the first set of consensus proposals is an absolute complement of the fourth set of consensus proposals for the N consensus proposals, and the fourth set of consensus proposals stores the N consensus proposals in a first round of consensus; merging the second set of consensus proposals into the first set of consensus proposals, and merging the third set of consensus proposals into the fourth set of consensus proposals, to perform a next round of consensus until the first set of consensus proposals stores the N consensus proposals and the N consensus proposals all include greater than or equal to 2f+1 identical consensus votes; and determining a consensus result based on counted consensus votes of the N consensus proposals in the last round of consensus.

The foregoing instructions, when executed by the portable electronic device that includes the plurality of application programs, can cause the consensus node shown in FIG. 3 to implement the functions of the embodiments shown in FIG. 1 to FIG. 2, which is not described herein again.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The foregoing descriptions are merely embodiments of this application, and are not intended to limit this specification. For a person skilled in the art, various modifications and changes may be made to this specification. Any modification, equivalent replacement, and improvement made within the spirit and principle of this application shall fall within the scope of the claims of this specification. In addition, all other embodiments obtained by a person of ordinary skill in the art without creative efforts shall fall within the protection scope of this file.

What is claimed is:

1. A blockchain consensus method, comprising:
   (i) performing, by a target consensus node of a blockchain, a current round of consensus, to count consensus votes of a number (N) of consensus proposals;
   (ii) traversing, by the target consensus node, a first set of consensus proposals, to perform the following steps: migrating consensus proposals that each receive greater than or equal to f+1 and less than 2f+1 identical consensus votes into a second set of consensus proposals; and migrating consensus proposals that each receive less than f+1 identical consensus votes into a third set of consensus proposals as opposition consensus opinions, wherein f is a number of fault tolerant consensus nodes of the blockchain;
   (iii) traversing, by the target consensus node, a fourth set of consensus proposals, to perform the following steps: migrating consensus proposals that each receive greater than or equal to 2f+1 identical consensus votes into the second set of consensus proposals; migrating consensus proposals that each receive greater than or equal to f+1 and less than 2f+1 identical consensus votes and are traceable based on an erasure coding algorithm into the second set of consensus proposals as agreement consensus opinions; migrating consensus proposals that each receive greater than or equal to f+1 and less than 2f+1 identical consensus votes and are untraceable based on the erasure coding algorithm into the third set of consensus proposals as opposition consensus opinions; and migrating consensus proposals that each receive less than f+1 identical consensus votes into the third set of consensus proposals as opposition consensus opinions, wherein the fourth set of consensus proposals stores the N consensus proposals in a first round of consensus, and the first set of consensus proposals is an absolute complement of the fourth set of consensus proposals for the N consensus proposals;
   (iv) merging, by the target consensus node, the second set of consensus proposals into the first set of consensus proposals, and merging the third set of consensus proposals into the fourth set of consensus proposals, to perform a next round of consensus;
   recursively performing, by the target consensus node, the steps (i)-(iv) until the first set of consensus proposals stores the N consensus proposals and the N consensus proposals each receive greater than or equal to 2f+1 identical consensus votes; and
   determining, by the target consensus node, a consensus result based on counted consensus votes of the N consensus proposals in the last round of consensus.

2. The method according to claim 1, further comprising:
before the first round of consensus is performed, transmitting, by the target consensus node, based on an epoch message in a reliable broadcast (RBC) protocol, consensus proposals initiated by the target consensus node to other consensus nodes of the blockchain, and after receiving consensus proposals transmitted through epoch messages by 2f of the other consensus nodes of the blockchain, tracing, by the target consensus node based on the erasure coding algorithm, remaining consensus proposals not received; and in the first round of consensus, casting, by the target consensus node, opposition consensus votes for consensus proposals that are untraceable based on the erasure coding algorithm in an RBC protocol stage and agreement consensus votes for remaining consensus proposals that are traceable based on the erasure coding algorithm in the RBC protocol stage.

3. The method according to claim 1, wherein:
the target consensus node traverses the fourth set of consensus proposals to further perform the following step: migrating consensus proposals that each receive only opposition consensus votes into the second set of consensus proposals.

4. The method according to claim 1, further comprising:
exchanging, by the target consensus node, a Consensus Message respectively with other consensus nodes of the blockchain to count the consensus votes of the N consensus proposals, wherein the Consensus Message transmitted by the target consensus node comprises: a field value of consensus votes of consensus proposals in the fourth set of consensus proposals and a field value of consensus votes of consensus proposals in the first set of consensus proposals recorded by the target consensus node.

5. The method according to claim 4, wherein:
a field value of a consensus vote of a consensus proposal agreed by the target consensus node in the Consensus Message is a root hash corresponding to the consensus proposal, and a field value of a consensus vote of a consensus proposal opposed by the target consensus node in the Consensus Message is 0.

6. The method according to claim 4, wherein:
the Consensus Message further comprises: a field value indicating a serial number of a consensus view and/or a field value indicating a consensus round.

7. The method according to claim 4, further comprising:
after counting Consensus Messages transmitted by 2f other consensus nodes, traversing, by the target consensus node, the first set of consensus proposals.

8. The method according to claim 1, further comprising:
after completely traversing the first set of consensus proposals, determining, by the target consensus node, whether the first set of consensus proposals stores the N consensus proposals and whether the N consensus proposals each receive greater than or equal to 2f+1 identical consensus votes; and if the first set of consensus proposals stores the N consensus proposals and the N consensus proposals each receive greater than or equal to 2f+1 identical consensus votes, ending, by the target consensus node, the consensus.

9. The method according to claim 1, wherein:
the N consensus proposals are initiated by different consensus nodes of the blockchain, any consensus proposal has one and only one type of consensus votes of a number greater than or equal to 2f+1, and a corresponding consensus result of any consensus proposal is a result indicated by the consensus votes of the number greater than or equal to 2f+1.

10. One or more non-transitory computer-readable storage media storing instructions executable by one or more processors, wherein execution of the instructions causes the one or more processors to perform operations comprising:
(i) performing a current round of consensus, to count consensus votes of a number (N) of consensus proposals;

(ii) traversing a first set of consensus proposals, to perform the following steps: migrating consensus proposals that each receive greater than or equal to f+1 and less than 2f+1 identical consensus votes into a second set of consensus proposals; and migrating consensus proposals that each receive less than f+1 identical consensus votes into a third set of consensus proposals as opposition consensus opinions, wherein f is a number of fault tolerant consensus nodes of a blockchain;

(iii) traversing a fourth set of consensus proposals, to perform the following steps: migrating consensus proposals that each receive greater than or equal to 2f+1 identical consensus votes into the second set of consensus proposals; migrating consensus proposals that each receive greater than or equal to f+1 and less than 2f+1 identical consensus votes and are traceable based on an erasure coding algorithm into the second set of consensus proposals as agreement consensus opinions; migrating consensus proposals that each receive greater than or equal to f+1 and less than 2f+1 identical consensus votes and are untraceable based on the erasure coding algorithm into the third set of consensus proposals as opposition consensus opinions; and migrating consensus proposals that each receive less than f+1 identical consensus votes into the third set of consensus proposals as opposition consensus opinions, wherein the fourth set of consensus proposals stores the N consensus proposals in a first round of consensus, and the first set of consensus proposals is an absolute complement of the fourth set of consensus proposals for the N consensus proposals;

(iv) merging the second set of consensus proposals into the first set of consensus proposals, and merging the third set of consensus proposals into the fourth set of consensus proposals, to perform a next round of consensus;

recursively performing the steps (i)-(iv) until the first set of consensus proposals stores the N consensus proposals and the N consensus proposals each receive greater than or equal to 2f+1 identical consensus votes; and determining a consensus result based on counted consensus votes of the N consensus proposals in the last round of consensus.

11. The one or more non-transitory computer-readable storage media according to claim 10, wherein the operations further comprise:
before the first round of consensus is performed, transmitting based on an epoch message in a reliable broadcast (RBC) protocol, consensus proposals initiated by a target consensus node of the blockchain to other consensus nodes of the blockchain, and after receiving consensus proposals transmitted through epoch messages by 2f of the other consensus nodes of the blockchain, tracing, based on the erasure coding algorithm, remaining consensus proposals not received; and in the first round of consensus, casting opposition consensus votes for consensus proposals that are untraceable based on the erasure coding algorithm in an RBC protocol stage and agreement consensus votes for remaining consensus proposals that are traceable based on the erasure coding algorithm in the RBC protocol stage.

12. The one or more non-transitory computer-readable storage media according to claim 10, wherein the operations further comprise:
traversing the fourth set of consensus proposals to perform the following step: migrating consensus proposals that each receive only opposition consensus votes into the second set of consensus proposals.

13. The one or more non-transitory computer-readable storage media according to claim 10, wherein the operations further comprise:
exchanging a Consensus Message respectively with other consensus nodes of the blockchain to count the consensus votes of the N consensus proposals, wherein the Consensus Message comprises: a field value of consensus votes of consensus proposals in the fourth set of consensus proposals and a field value of consensus votes of consensus proposals in the first set of consensus proposals.

14. The one or more non-transitory computer-readable storage media according to claim 13, wherein:
a field value of a consensus vote of a consensus proposal agreed to in the Consensus Message is a root hash corresponding to the consensus proposal, and a field value of a consensus vote of a consensus proposal opposed to in the Consensus Message is 0.

15. The one or more non-transitory computer-readable storage media according to claim 13, wherein:
the Consensus Message further comprises: a field value indicating a serial number of a consensus view and/or a field value indicating a consensus round.

16. The one or more non-transitory computer-readable storage media according to claim 13, wherein the operations further comprise:
after counting Consensus Messages transmitted by 2f other consensus nodes, traversing the first set of consensus proposals.

17. The one or more non-transitory computer-readable storage media according to claim 10, wherein the operations further comprise:
after completely traversing the first set of consensus proposals, determining whether the first set of consensus proposals stores the N consensus proposals and whether the N consensus proposals each receive greater than or equal to 2f+1 identical consensus votes; and
if the first set of consensus proposals stores the N consensus proposals and the N consensus proposals each receive greater than or equal to 2f+1 identical consensus votes, ending the consensus.

18. The one or more non-transitory computer-readable storage media according to claim 10, wherein:
the N consensus proposals are initiated by different consensus nodes of the blockchain, any consensus proposal has one and only one type of consensus votes of a number greater than or equal to 2f+1, and a corresponding consensus result of any consensus proposal is a result indicated by the consensus votes of the number greater than or equal to 2f+1.

19. A system comprising one or more processors and one or more non-transitory computer-readable memories coupled to the one or more processors and configured with instructions executable by the one or more processors to cause the system to perform operations comprising:

(i) performing a current round of consensus, to count consensus votes of a number (N) of consensus proposals;
(ii) traversing a first set of consensus proposals, to perform the following steps: migrating consensus proposals that each receive greater than or equal to f+1 and less than 2f+1 identical consensus votes into a second set of consensus proposals; and migrating consensus proposals that each receive less than f+1 identical consensus votes into a third set of consensus proposals as opposition consensus opinions, wherein f is a number of fault tolerant consensus nodes of a blockchain;
(iii) traversing a fourth set of consensus proposals, to perform the following steps: migrating consensus proposals that each receive greater than or equal to 2f+1 identical consensus votes into the second set of consensus proposals; migrating consensus proposals that each receive greater than or equal to f+1 and less than 2f+1 identical consensus votes and are traceable based on an erasure coding algorithm into the second set of consensus proposals as agreement consensus opinions; migrating consensus proposals that each receive greater than or equal to f+1 and less than 2f+1 identical consensus votes and are untraceable based on the erasure coding algorithm into the third set of consensus proposals as opposition consensus opinions; and migrating consensus proposals that each receive less than f+1 identical consensus votes into the third set of consensus proposals as opposition consensus opinions, wherein the fourth set of consensus proposals stores the N consensus proposals in a first round of consensus, and the first set of consensus proposals is an absolute complement of the fourth set of consensus proposals for the N consensus proposals;
(iv) merging the second set of consensus proposals into the first set of consensus proposals, and merging the third set of consensus proposals into the fourth set of consensus proposals, to perform a next round of consensus;
recursively performing the steps (i)-(iv) until the first set of consensus proposals stores the N consensus proposals and the N consensus proposals each receive greater than or equal to 2f+1 identical consensus votes; and
determining a consensus result based on counted consensus votes of the N consensus proposals in the last round of consensus.

20. The system of claim 19, wherein the operations further comprise:
before the first round of consensus is performed, transmitting based on an epoch message in a reliable broadcast (RBC) protocol, consensus proposals initiated by a target consensus node of the blockchain to other consensus nodes of the blockchain, and after receiving consensus proposals transmitted through epoch messages by 2f of the other consensus nodes of the blockchain, tracing, based on the erasure coding algorithm, remaining consensus proposals not received; and
in the first round of consensus, casting opposition consensus votes for consensus proposals that are untraceable based on the erasure coding algorithm in an RBC protocol stage and agreement consensus votes for remaining consensus proposals that are traceable based on the erasure coding algorithm in the RBC protocol stage.

* * * * *